No. 889,414. PATENTED JUNE 2, 1908.
E. R. TYLER.
STOCK AND SALES REGISTER.
APPLICATION FILED JAN. 10, 1908.
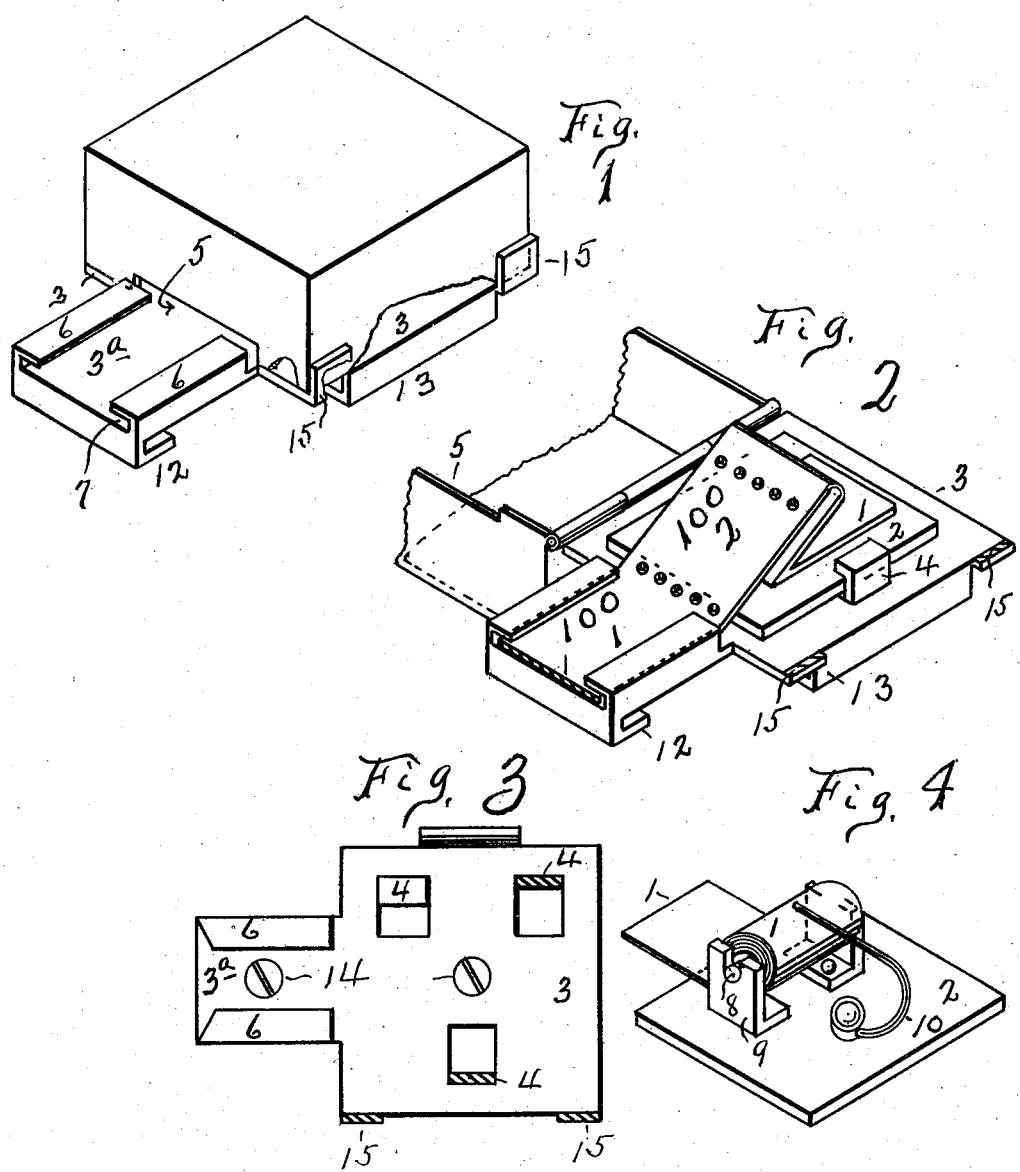

UNITED STATES PATENT OFFICE.

EDWARD R. TYLER, OF FREMONT, OHIO.

STOCK AND SALES REGISTER.

No. 889,414.  Specification of Letters Patent.  Patented June 2, 1908.

Application filed January 10, 1908. Serial No. 410,258.

*To all whom it may concern:*

Be it known that I, EDWARD R. TYLER, citizen of the United States, residing at Fremont, in the county of Sandusky and State of Ohio, have invented certain new and useful Improvements in Stock and Sales Registers, of which the following is a specification.

The general purpose and object of my invention is, to provide a handy and convenient method of keeping a register of the number of articles sold or removed from a given box or package; as well as the number remaining in said box or package.

As an illustration of the purpose and object of my invention, reference may be had to the sale of cigars, jewelry, etc., from boxes, or trays, which contain a given quantity of the same kind, as a box of 100 cigars, or a tray of one gross of rings, each of the same weight and value.

In the practical use of my device, the register at the outset would be stored with a record strip, measuring the total number of cigars in the box, or of rings in the tray, to which the register is attached; and as will be more particularly explained later herein, my device is such that as any given number is removed, it is intended that a corresponding number be removed or detached from the record strip, so that not only the amount of stock at any time disposed of or removed may be determined, but also the amount of stock remaining.

Referring to the drawings, Figure 1 represents a perspective view of my register with the cover closed. Fig. 2 represents the same, with the cover thrown back and disclosing the record strip, with the record beginning at "1", as before any part of the contents have been removed. Fig. 3 represents in top view the lower or bed portion of my register which carries the record strip. Fig. 4 represents a modified manner of carrying the record strip.

Coming now to a more specific description of my invention: My invention consists in part of a record strip 1, on which, by printing or otherwise, is indicated a certain number in series, as 100, which represents the number of a given lot of goods, such as cigars, or rings, each of which singly have a certain selling price, and which in quantities, as for six, or one dozen, have also a certain selling price. Each fraction of said strip bearing said number, beginning with the unit "1", is then numbered consecutively and numerically in order from "1" up to such number as may equal the number of pieces, as cigars or rings contained in the box, or tray. In order that said strips may be printed to accommodate different sized packages, said numbers may be made to reach a higher number. In that event, it is my intention that the number of pieces contained in a given box, when full, may be indicated on a suitable label which may be pasted on to, or otherwise attached to said box or tray. The inner end of said strip I make fast to a block or card 2, which rests upon the lower or bed portion 3, and is held removably in place by means of fingers 4 which spring from said bed portion. Said strip is preferably loaded upon said block by folding as represented in Fig. 2, and it is made fast thereto by paste or otherwise as preferred; though it may be carried otherwise, as shown in Fig. 4. Said strip being either folded, or suitably mounted upon the block 2 in any suitable manner, is drawn outward through a slot 5 cut in the edge of the cover, and over an extension $3^a$ of said bed, where it is guided between flanges 6 which are formed over the edges of said strip, so as to make a slot 7 through which said strip is drawn. Said part 3 is die-formed or struck up, and is made of any suitable material, the fingers 4 together with said extension and said flanges 6 being integral therewith. Said record strip may be of any sufficiently strong paper, or other material suitable for the purpose; and which may be with or without perforations on the lines of the fold.

As represented in Fig. 4, the strip 1 may be wound upon a suitable roller 8, which is journaled in standards 9 which rise from said block 2. In this event it is necessary to throw some friction upon said roller or upon the rolled strip to prevent the same from being drawn too easy, and for that purpose I provide a suitable spring 10. While said strip may be wound upon said roller, for the purpose of storage, nevertheless, I prefer to fold the same in equal folds, equal to the distance between the series of numbers; and this I do so that said strip may be drawn more easily, and withal, so that it may not be drawn too easy, and thus accumulate a surplus outside the register.

It may now be understood that in using said register, for instance in the sale of cigars, that the same is clamped upon the cover of the cigar box by means of the fingers 12 and 13, the former of which reaches down from the extension 3ᵃ, and the latter from the bed piece 3, all of which are integral therewith; and that in case of sale, said strip will be drawn and detached according to the number of cigars sold. These detached parts may then be handled as any merchant may desire. Manifestly where a record is kept of the showing of said strip, day by day, the amount of sales for any day may readily be determined. In order that said strip may readily show how much thereof has been removed, I make said extension 3ᵃ to project outward from said bed proper, a distance equal to the measure between successive numbers thereon.

In case it may not be convenient to secure said register in place by means of the fingers 12 and 13, then I intend that the same may be secured by means of a screw 14 or some other suitable means; and in that event, the fingers will be cut away. In order that said cover may be held closed, I provide the bed piece with suitable fingers 15 made integral therewith and made to engage said cover as it is closed, said cover being suitably adapted therefor and said fingers being made to yield slightly for the purpose.

Having now fully described my invention, what I claim is:

1. A stock and sales register comprising a removable block, upon which is folded an expandible record strip, and to which, said strip at its inner end is made fast; a die-formed or struck-up bed made to receive and support said block, said bed having fingers which spring from its upper surface made to receive and hold the same; a recessed cover which is hinged to said bed and is made to cover and protect said strip, said cover having a slot cut in one of its edges made to receive and permit the draft of said strip, together with an extension of said bed over which said strip is drawn, said extension being made with flanges and slots for receiving and guiding the edges of said strip; all of which said fingers, extension, and flanges, are made integral with said bed; means for holding the cover closed; and means for securing said register in place, all in combination.

2. A stock and sales register comprising a removable block, together with means adapted to carry and pay out as required, an expandible record strip; a die-formed or struck-up bed made to receive and support said block, said bed having fingers which spring from its upper surface, made to receive and hold the same; a recessed cover which is hinged to said bed and is made to cover and protect said strip, said cover having a slot cut in one of its edges, made to receive and permit the draft of said strip; together with an extension of said bed over which said strip is drawn, said extension being made with flanges and slots for receiving and guiding the edges of said strip; all of which said fingers, extension, and flanges, are made integral with said bed; means for holding the cover closed, and means for securing said register in place, all in combination.

3. In a stock and sales register a die-formed or struck-up bed piece; with fingers springing out therefrom adapted to receive and hold a card or block, and having an extension thereof, the edges of which are flanged and made to form a slot adapted to receive and guide a moving strip, said fingers and flanges being formed upon one side of said bed and its extensions, and said bed and extensions being provided with certain other fingers which are formed upon the opposite side thereof, whereby said register may be held in place upon the lid or cover of a box, all of which fingers, extension, and flanges, are made integral with said bed; and a recessed cover hinged thereto, said cover having a slot formed in one of its edges, adapted to receive and permit to be drawn said moving strip; and means for holding said cover closed when shut, all in combination.

In testimony whereof I affix my signature in presence of two witnesses.

EDWARD R. TYLER.

Witnesses:
 FRANK J. TUTTLE,
 C. B. CARR.